Figure 1:
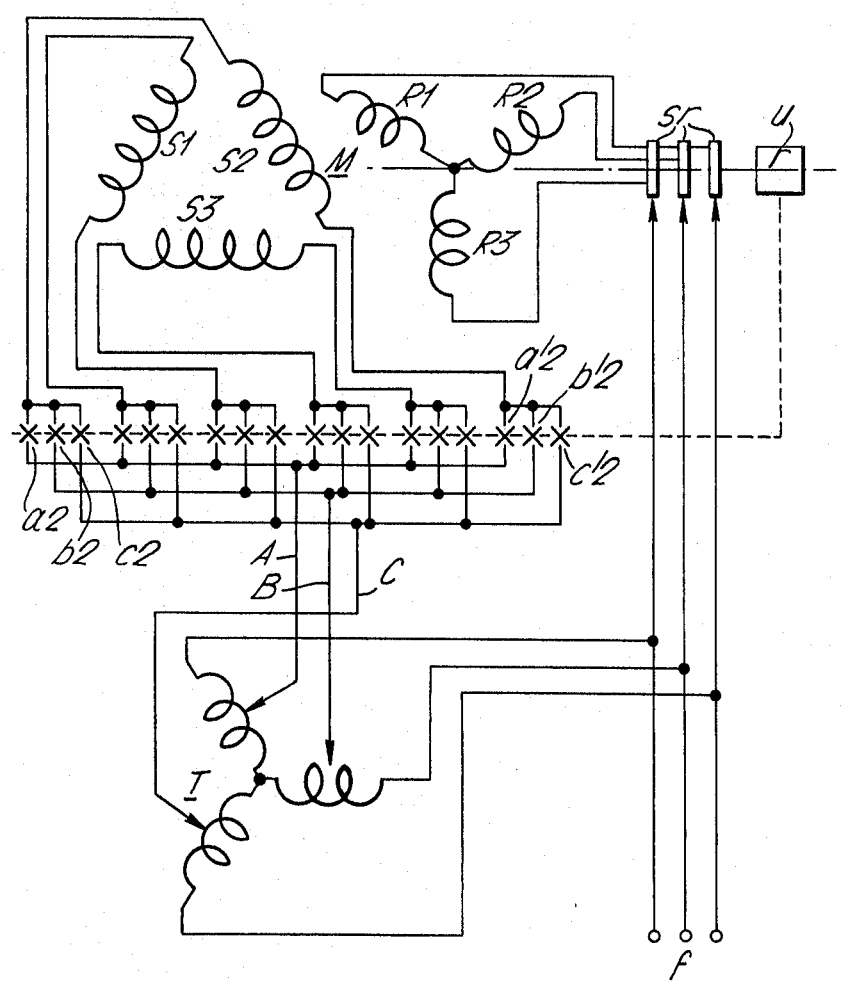

March 22, 1966  P. J. G. HETZEL  3,242,408
VARIABLE SPEED INDUCTION MOTORS
Filed July 19, 1962  2 Sheets-Sheet 1

INVENTOR
PETER JOHN GRENVILLE HETZEL
By: Morris + Bateman, Attys

United States Patent Office 3,242,408
Patented Mar. 22, 1966

3,242,408
VARIABLE SPEED INDUCTION MOTORS
Peter John Grenville Hetzel, Cawston, Rugby, England, assignor to Associated Electrical Industries Limited, London, England, a company of Great Britain
Filed July 19, 1962, Ser. No. 210,992
Claims priority, application Great Britain, July 19, 1961, 26,180/61
3 Claims. (Cl. 318—197)

In a know variable speed induction motor arrangement including an induction motor with wound secondary (usually rotor) winding, a frequency converter of known commutator type fed with a voltage at the frequency of the supply to the induction motor primary winding is mounted on the rotor shaft and generates a voltage at slip frequency which is injected into the secondary winding so as to buck or boost the slip frequency voltage induced therein from the primary winding, the speed of the motor then being variable by adjustment of the amplitude of the supply frequency voltage applied to the frequency converter. When the frequency converter output is bucking the secondary voltage the motor will operate below synchronous speed and increase of the converter output, namely by increasing the amplitude of the voltage applied to it, will reduce the speed of the motor. Likewise when the frequency converter output is boosting the secondary voltage, the motor will run above synchronous speed and increase of the frequency converter output will increase the motor speed. Adjustment of the phase of the injected voltage, for instance by varying the position of the brushes on the commutator of the frequency converter, will also result in some variation in speed of the induction motor. Such change in phase will also alter the power factor of the motor, as will also, to some extent, variation of the magnitude of the injected voltage. However the fact that the frequency converter is of a commutator type imposes on the arrangement the well known limitations of commutator machines.

The present invention provides an arrangement in which a variable voltage at the frequency $(f)$ of the supply to the primary winding of an induction motor is applied to its secondary winding by way of a plurality of static electronic switching devices, preferably semi-conductor devices, arranged to be rendered conductive in a predetermined cyclic sequence, at a cyclic frequency $r$ determined by the speed of the motor, such as to produce in the secondary winding a voltage at frequency $f-r$, the frequency $r$ being so related to the motor speed in accordance with the number of pole pairs that $f-r$ corresponds to the slip frequency. This slip frequency voltage can be arranged to buck or boost that induced in the secondary winding from the primary and the arrangement permits the motor speed to be varied by variation of the supply frequency voltage applied to the secondary via the switching devices.

For reasons which will be considered later, six- or twelve-phase switching by the switching devices is desirable (assuming a three-phase supply system). This would require a corresponding number of slip rings on the motor if its secondary winding was its rotor winding, therefore it is preferable in carrying out the invention for the secondary winding to be the stator winding.

In carrying out the invention for a motor with multiphase secondary each phase of the secondary winding can be switched from phase to phase of a variable multiphase voltage of frequency $f$ at a cyclic frequency of $r$ times per second, the arrangement being such that the voltage injected into the motor secondary by way of the switching devices will have an effective frequency $f-r$. Other, higher, frequencies will also be generated depending on the number of phases, and in general the wave shape of the injected voltage improves as the number of phases increases. However the number of switching devices required also increases with the number of phases and it is therefore advantageous so to organize the switching that for a given number of phases the same effect is obtained, as regards wave shape, as for a greater number of switches. This will now be considered, assuming a three-phase secondary winding on the motor and a three-phase supply frequency voltage to be injected into it by way of the switching devices.

If the three phase lines are denoted by A, B and C, the three phases of the secondary winding may be connected at one end to a common (neutral point) and have their other ends connected in sequence to the lines A, B and C, this requiring only three switches per phase but giving only a three-phase wave shape. If, however, both ends of each phase are selectively connectible to the lines A, B and C through respective switches, then if the switches are operated sequentially so that each phase is connected across the lines (one pair of lines at a time) in the repeated sequence AB, AC, BC, BA, CA, CB, the wave shape in the secondary windings will correspond to the wave shape that would be obtained with a six-phase input although there are in fact only three output phases. It will be observed that this wave form is obtained without the introduction into the circuit of a three-phase to six-phase transformer. It is also to be noted that the wave shape is maintained for power flow in either direction without any reconnection of the components, whereas if a three-phase to six-phase transformer had to be used it would be necessary to reconnect it from one side to the other side of the switches. It is to be noted that with the switching sequence last mentioned the three phases of the secondary winding would not be connected internally but would at any time be connected in delta through the particular switching devices that are then conducting. The winding phases would of course be connected to different voltage phases at any time, being connected initially say to AB, BC and CA respectively and thereafter all following the same overall sequence.

Figure 2:
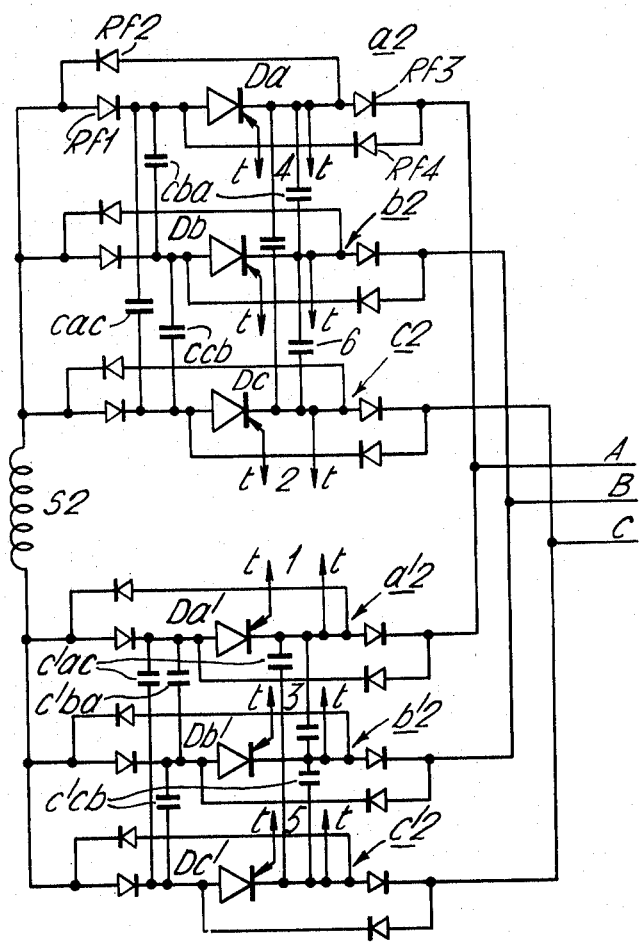

An embodiment of the invention arranged for operation in the manner just indicated is schematically illustrated by way of example in FIG. 1 of the accompanying drawings, FIG. 2 of which illustrates a specific switching arrangement.

Referring to the drawings, S1, S2, S3 represent the three-phase secondary winding of an induction motor M having a wound three-phase rotor winding R1, R2, R3 fed via slip rings sr from a three-phase supply voltage of frequency $f$. A variable transformer T is also fed from the same supply and has output connections A, B and C constituting supply lines for a voltage which is to be injected into the secondary windings by way of a plurality of sequentially operated electronic switching devices represented by X's. Each secondary winding phase S1, S2, S3 has each of its ends connected to three of the switching devices by which the end of the winding can be connected to any one of the three lines A, B and C. The switching devices will be identified, according to the lines to which they afford connection, by the letters $a$, $b$, $c$ for one end of a winding and $a'$, $b'$, $c'$ for the other end of the same winding, with a suffix 1, 2 or 3 according to the particular winding S1, S2 or S3 to which they relate. Thus for example by the switching devices marked $a2$, $b2$ and $c2$ on the drawing one end of winding S2 can be connected to any one of the lines A, B, C, while by the switching devices marked $a'2$, $b'2$, $c'2$ the other end of winding S2 can be connected to any one of these lines. Under the control of a timing unit U mounted on the rotor shaft, the switching devices are cyclically operated, at a frequency $r$ corresponding to the speed of rotation of the shaft times the number of pole pairs of the motor M, in a sequence such that, starting for example with winding S1 connected across the lines A and B, winding S2 connected across lines B and C and winding S3 connected across lines C and A by means of the relevant switches in each case, the connection of each winding to the lines is recurrently changed in a sequence according to Table I below. The sequential operation of the switching devices to achieve this is shown in Table II. In both tables the sequence of events progresses from left to right of the table.

*Table I*

| Winding | Connected across— | | | | | | |
|---------|----|----|----|----|----|----|----|
| S1 | AB | AC | BC | BA | CA | CB | AB |
| S2 | BC | BA | CA | CB | AB | AC | BC |
| S3 | CA | CB | AB | AC | BC | BA | CA |

*Table II*

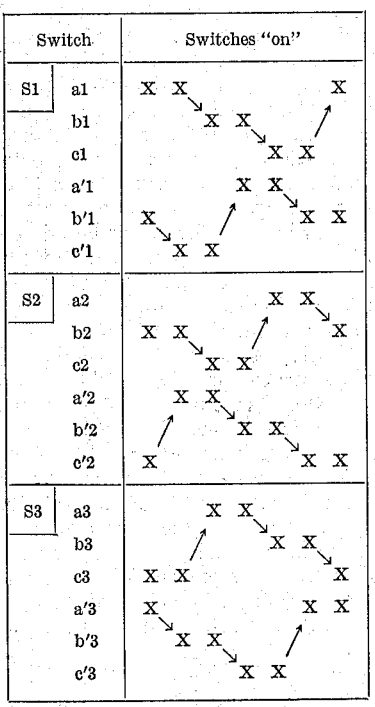

As a result of such operation there will be produced in the secondary winding S1, S2, S3 of the motor a voltage of frequency $f2-f1$ having a wave shape corresponding to that resulting from a six-phase to six-phase conversion. This voltage, being at slip frequency, bucks or boosts that induced in the secondary winding from the primary winding R1, R2, R3, enabling the speed of the motor to be controlled, by variation of transformer T, according to the principles already explained.

In carrying out the invention the electronic switching devices can be switched on (that is, rendered conductive) by means of pulses applied to them at appropriate times by the timing unit U which may be constituted, for example, by a pulse generating and distributing arrangement such as that described in our copending application No. 141,390. By referring to Table II and considering the switching actions indicated by the diagonal arrows for winding S1, it can be seen that for each of the windings S each step of the switching sequence involves the switching off of one of the two associated switches which was then "on" and the switching on of another of the associated switches connected to the same end of the winding as that switched off. The electronic switching devices, for which semi-conductor devices such as transistors or semi-conductor controlled rectifiers (trigger diodes) are preferred, can therefore be arranged for operation in bistable pairs, for example in a manner similar to that described in our copending application No. 60,881 with reference to FIG. 7 thereof.

Such an arrangement is shown in FIG. 2 of the drawings, in which the switching arrangement for only one of the secondary windings of the motor (winding S2) is shown, the others being similar.

Referring to the accompanying drawing, switches $a2$, $b2$, $c2$, $a'2$, $b'2$ and $c'2$ associated with winding S2 are constituted by respective trigger diodes $Da$, $Db$, $Dc$, $Da'$, $Db'$ and $Dc'$ round each of which (being a unidirectional device) is connected a rectifying bridge such as that constituted by rectifiers R1 R2, R3, R4 for $Da$, so that alternating current can be switched. Triggering connections $t-t$ are taken to each of the trigger diodes and have triggering pulses applied to them in the numerical sequence 1, ... 6 as marked, these pulses being obtained, for instance, from successive output windings of a pulse distributor such as that described in our said copending application No. 141,390. The trigger diodes $Da$, $Db$, $Dc$ connected to one end of winding S2 are coupled in bistable pairs by capacitors $Ccb$, $Cac$, $Cba$. Trigger diodes $D'a$, $D'b$, $D'c$ at the other end of the winding S2 are similarly coupled by capacitors $C'ac$, $C'ba$, $C'cb$.

As is known, a trigger diode can be rendered conductive by applying a triggering pulse of appropriate polarity to its trigger electrode: on cessation of the pulse the diode will remain conducting until the voltage across it is removed or reduced below a critical value. In the present instance, the application of triggering pulses to the trigger diodes in the sequence indicated will produce a sequence of switching actions for winding S2 in conformity with Table II above. Each pulse will switch "on" the trigger diode to which it is applied, and the resultant change of voltage across this diode will be transferred via the coupling capacitors to the other trigger diodes at the same end of winding S1, thereby reducing the voltage across these other diodes and switching "off" the one that was previously "on."

In the embodiment illustrated, the secondary winding phases S1, S2, S3 are connected, through the switching devices that are "on" at any time, in delta formation. As an alternative star arrangement giving an injected voltage of similar wave shape in the secondary winding, a neutral line (not shown but denoted by N hereafter) could be taken from the star point of transformer T and the ends of each winding phase S1, S2, S3 could be connected to the lines by appropriately controlled switching devices in the repeated sequence AN, NC, BN, NA, CN, NB, AN, ... and so on, starting, of course with different connections (for example to AN, BN and CN respectively) of the several winding phases. A similar timing unit U could be used for this purpose.

Power factor control can be achieved by altering the phase of the switching frequency $r$ with respect to the supply frequency $f$, for instance by altering the angular position of the stator of the timing unit U, assuming that it is some form of co-operating rotor and stator arrangement as in our copending application No. 141,390.

What I claim is:

1. Speed control arrangement for an induction motor having a primary winding energizable from an alternating supply of frequency $f$ and a secondary winding, said arrangement comprising a source of variable plural-phase voltage having the supply frequency $f$, connections between said secondary winding and each of several phases of said source, said connections including individual alternating current switching means comprising static electronic switching devices, and switching control means for switching said secondary winding to the several phases of said source in turn in a cyclically repeated sequence having a cyclic frequency $r$ dependent on the motor speed such that $f-r$ corresponds to the slip frequency in the secondary winding, said switching control means comprising a timing means actuated by the motor in accordance with the speed thereof and operatively connected to said individual switching means for operating them in sequence corresponding to the cyclic switching sequence.

2. Speed control arrangement for an induction motor having a primary winding energizable from an alternating supply of frequency $f$ and a plural-phase secondary winding, said arrangement comprising a source of variable plural-phase voltage having the supply frequency $f$, connections between said end of each phase of said secondary winding and each phase of said source, said connections including individual alternating current switching means comprising static electronic switching devices, and switching control means for switching each secondary winding phase to the several phases of the source in turn, firstly in one sense of connection thereto and then in reversed sense, in a cyclically repeated sequence having a cyclic frequency $r$ dependent on the motor speed such that $f-r$ corresponds to the slip frequency in the secondary winding, said switching control means comprising a timing means actuated by the motor in accordance with the speed thereof and operatively connected to said individual switching means for operating them in sequence corresponding to the cyclic switching sequence.

3. Speed control arrangement as recited in claim 2 wherein the secondary winding of the induction motor is on the stator thereof.

References Cited by the Examiner
UNITED STATES PATENTS
2,236,984   4/1944   Alexanderson ____ 318—237 X MILTON O. HIRSHFIELD, *Primary Examiner.*